Nov. 22, 1927.　　　　　　　　　　　　　　　1,649,854
J. E. PERRAULT
MACHINE FOR MAKING MULTIPLE FASTENER ELEMENTS
Filed June 2, 1926　　　5 Sheets-Sheet 1

Inventor:
Joseph E. Perrault,

Nov. 22, 1927.

J. E. PERRAULT 1,649,854

MACHINE FOR MAKING MULTIPLE FASTENER ELEMENTS

Filed June 2, 1926   5 Sheets-Sheet 5

Inventor:
Joseph E. Perrault,
by Spear, Middleton, Donaldson, Hall
Attys.

Patented Nov. 22, 1927.

1,649,854

UNITED STATES PATENT OFFICE.

JOSEPH E. PERRAULT, OF WATERTOWN, MASSACHUSETTS, ASSIGNOR TO HOOD RUBBER COMPANY, OF WATERTOWN, MASSACHUSETTS, A CORPORATION OF MASSACHUSETTS.

MACHINE FOR MAKING MULTIPLE FASTENER ELEMENTS.

Application filed June 2, 1926. Serial No. 113,274.

My present invention relates to a method of, and machine for producing the male elements of multiple fasteners of the type disclosed in Letters Patent of the United States issued to the Hood Rubber Company, assignee on the 26th day of January, 1926.

In devising the said invention I have aimed to provide a method and machine by which such fastener elements can be produced rapidly, economically and with extreme accuracy as to size and shape.

I have also aimed to provide a machine by which multiple stock rods can be supplied to the apparatus and manipulated or worked thereby.

I have further aimed to provide apparatus in which the stock rod or rods will at all times be properly held and its position for the successive operations accurately gauged, and in which accidental operation of machine parts will be absolutely prevented.

With these and other objects in view, which will hereinafter appear, the invention includes the novel method of operation and form of apparatus for carrying out such method as hereinafter described, what I claim as my invention being defined and ascertained by the claims appended hereto.

What I at present consider the preferred embodiment of the apparatus included in my invention, is illustrated in the accompanying drawings, in which:—

Fig. 7 is a detail elevation of the drive pulley and control mechanism.

Figs. 8, 9, 10 and 11 are enlarged sectional detail views illustrating the chuck and cooperating parts in their sequence of operations.

Fig. 12ª is a view of the completed article slotted for application to the carrying tape.

In these drawings similar reference characters indicate the same or like parts whenever used.

Figure 12:
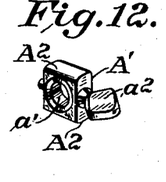
Fig. 12 is a perspective of a fastener member as produced by the machine.
Figure 12A:
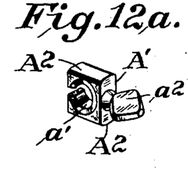

The machine is intended to produce an article in the form shown at A', Fig. 12, from solid stock bars A, of substantially rectangular shape in cross section, said articles or elements having transverse openings $a'$ and approximately arrow shaped heads $a^2$. The stock bars are of malleable metal such as brass and are made with their opposed edges rounded as indicated at $A^2$ in the article Fig. 12.

Briefly stated, the machine includes means whereby the stock bar is fed forward until its end contacts with a suitable stop and it is rotated while suitable cutters operate thereon to provide a cone-shaped portion and an annular grove at the base thereof. Thereafter the stock bar is held stationary in predetermined position while suitable drilling devices form a hole through the stock bar adjacent the groove and cutting devices trim off opposite faces of the cone-shaped end to form a substantially flat arrow-shaped head, whereafter the cycle of operations is repeated.

In the apparatus shown in the drawings I have included two sets of instrumentalities for operating upon two bars of stock at a time, though obviously, one set or a number greater than two could be provided if desired.

Preparatory to being fed to the machine, each stock bar is inserted in a tube 1 having an elongated slot 1ª therein, the tube being of an internal diameter to permit the bar to rotate and slide freely therein while holding it against bending or vibration.

The loaded tube is placed in a receiving trough 2, preferably lined with a cushion surfacing material 2ª, and the tube has its forward end secured in a holding member 3 which in the embodiment shown takes the form of a post having a transverse eye or opening in which the end of the tube is clamped by set screw 3ª.

The post 3 has its lower end detachably connected with a fixed supporting member 3ᵇ, conveniently, by providing it with a reduced end fitting a socket in the supporting member, whereby each tube may be easily lifted out of its trough for refilling and replacement.

Figures 1, 13, 14:
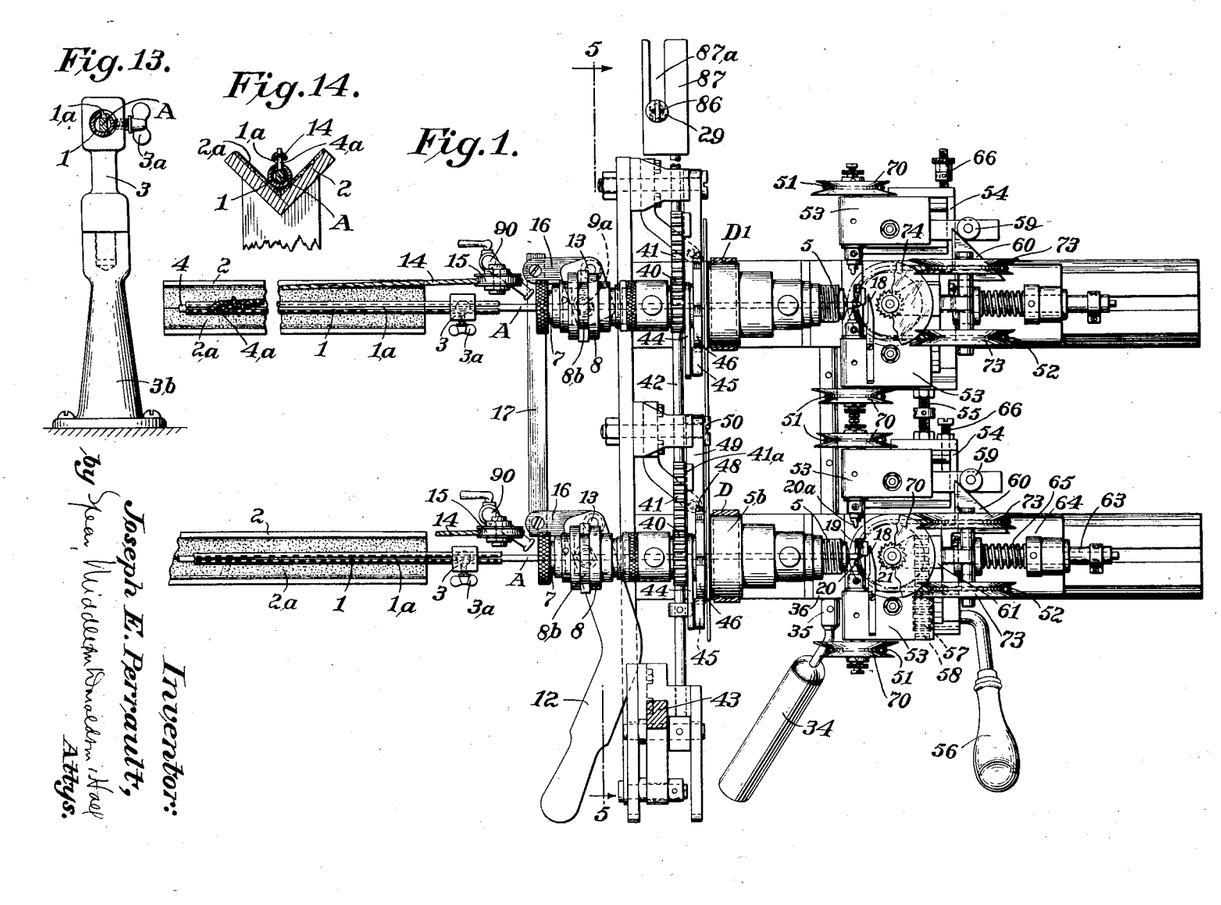
Figure 1 is a plan view with the belt drives and table omitted for clearness of illustration.
Figs. 13 and 14 are detail views of the tube holder.

Within the tube is located a rod pusher or follow-up member 4 which has a web or lug 4ᵃ extending up through the slot to which is connected means tending constantly to move the pusher and rod in a feed direction or towards the cutters hereinafter described (towards the right Fig.1).

Figures 3, 6:
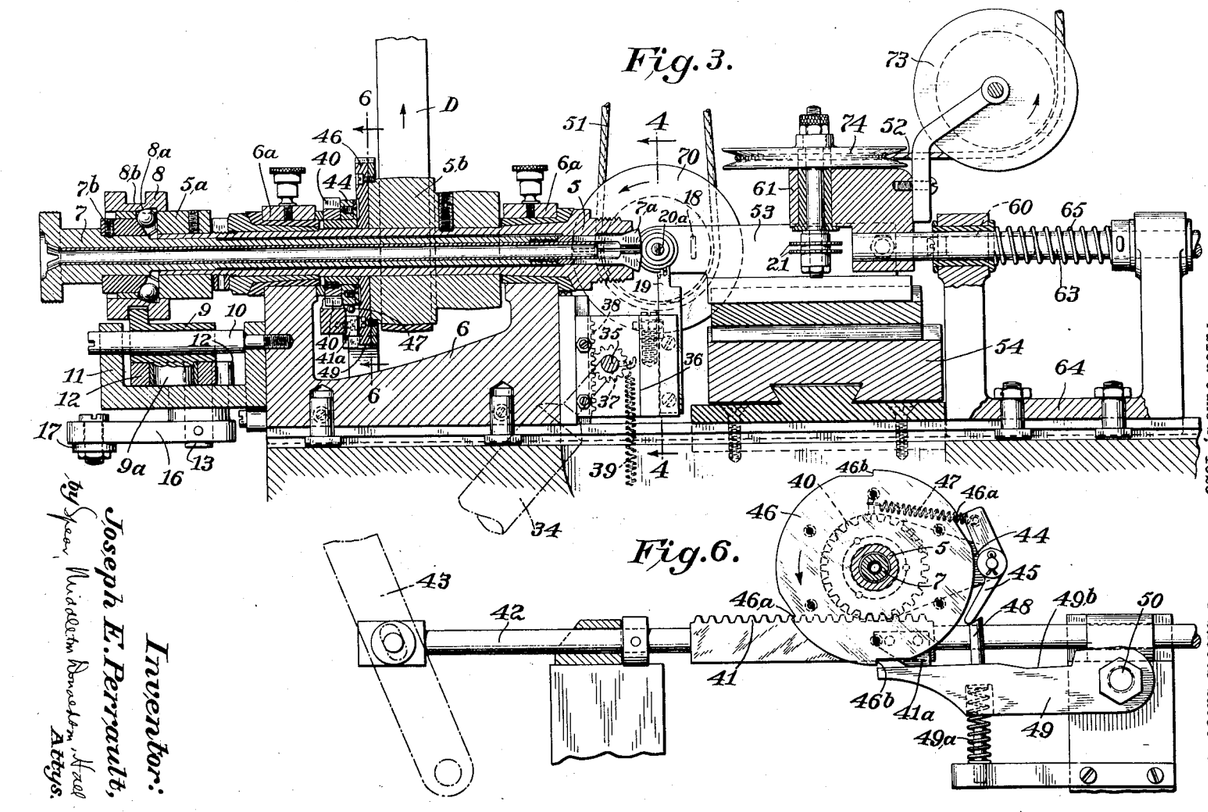
Fig. 3 is an enlarged longitudinal vertical section through the chuck and associated parts.
Fig. 6 is an enlarged sectional elevation on line 6—6 of Fig. 3, showing the indexing mechanism disengaged.

The troughs and holding members are disposed so that the rods will be held in axial alignment with the holding and rotating chucks, one of which is shown in an enlarged section in Fig. 3.

This comprises a tubular member 5, or chuck spindle mounted in suitable bearings 6ᵃ in the head stock 6, within which is slidably mounted a tubular chuck carrying member 7 which carries at its forward end the tube gripping jaws 7ᵃ which are adapted normally to spread apart to release the tube, but which can be forced into gripping engagement with the tube by longitudinal movement of the member 7 to the left, Fig. 3, through the coaction of their outer inclined faces with the flared portion of the inner wall of the chuck socket adjacent its end. For effecting axial movement of the jaw-carrying member 7, I provide the chuck socket member 5 with a collar 5ᵃ fast thereon, and the projecting portion of the member 7 with a suitable collar 7ᵇ fast thereon, and having an annular wall adjacent to but spaced from the end wall of collar 5ᵃ, one of these walls, as for example the wall of collar 7ᵇ being inclined so that an annular outwardly flared channel is provided between the two collars. Within this channel is arranged an annular series of balls which are encircled and held in place by a shiftable ring 8 having an internal annular inclined ball engaging wall 8ᵃ. Ring 8 has an annular groove 8ᵇ which is engaged by a projection on a shifter member 9 slidably mounted on a cross pin 10 supported by the forked bracket 11 carried by the head stock and actuated by a hand operated shifter lever 12 (Figs. 1 and 3). Lever 12 is secured to a pin or short shaft 13, rotatably held in a corresponding hole in the bottom wall of the bracket through which it projects and is provided with an elongated slot which is engaged by a lug or projection 9ᵃ depending from the shifter member 9.

Movement of the shifter member 9 to the right (Fig. 3) imparts corresponding movement to the clutch ring 8 and the inner inclined annular wall thereof forces the balls radially inward. This movement of the balls, through the wedge-shape of the space between collars 5ᵃ and 7ᵇ, forces the jaw-carrying member to the left thereby causing the jaws 7ᵃ to grip the stock rod.

When the jaws are open the stock rod is fed forward automatically by a flexible element 14 which has one end secured to the lug 4ᵃ of the follow-up plunger, the other end being passed over a pulley 15 journaled on a fixed support and provided with tension means such as a weight (not shown).

Pin or shaft 13 carries an arm 16 which is connected to a similar arm associated with the clutch shifter of the companion mechanism by a suitable link 17. As the two sets of mechanism for operating on two stock bars simultaneously are duplicates of each other, a description of one will apply to both.

As above stated, when the chuck or gripping jaws are opened, the stock bar is automatically fed forward until its front end contacts with a stop 18 held normally in arresting position, but movable from such position for a purpose which will hereinafter appear.

At this point it is deemed advisable in the interest of elucidation, to describe the sequence of operations in the formation of the article shown in Fig. 12, and for this purpose reference is made to Figs. 8 to 11, inclusive.

At the commencement of the sequence of operations, the gripping jaws being open, the stock bar is fed forward automatically as heretofore described, until its end, shown by dotted lines, Fig. 8, abuts against the stop bar 18.

The gripping jaws are then caused to grip the bar and the same is rotated in the manner hereinafter described, and the cutting tool 19 is moved into contact with the rotating stock and caused to progress towards the axis thereof until it reaches the position shown in Fig. 8, at which time a cone-shaped head and annular groove will be turned thereon and therein, the end of the cone-shaped head being joined to the terminal portion of the stock bar, indicated by dotted lines, by so slight a connection that it easily breaks off, the portion indicated by said dotted lines being, of course, thrown to waste.

The power rotation of the chuck is now stopped, and regardless of where the flat sides of the stock come to rest relative to a vertical position, it is turned by means hereinafter described so that it shall be accurately indexed or positioned with its flat faces perpendicular to the boring and countersinking drills disposed on opposite sides thereof, these boring drills working in a plane perpendicular to the plane of the cutting tool 19.

Figures 7, 9:
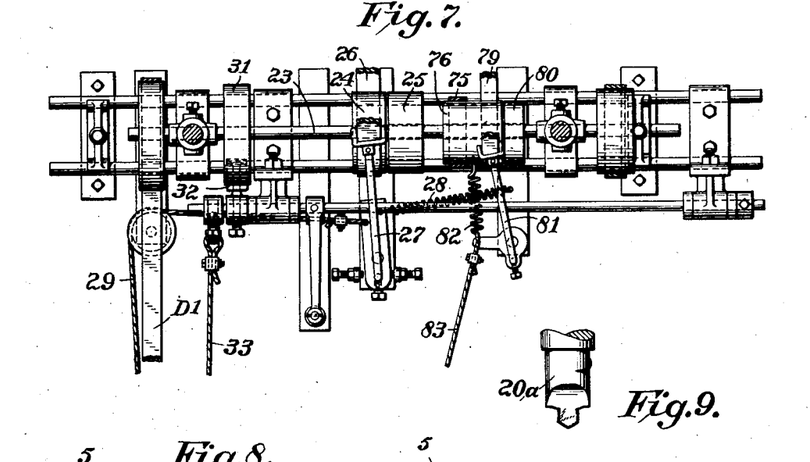
Figure 10:
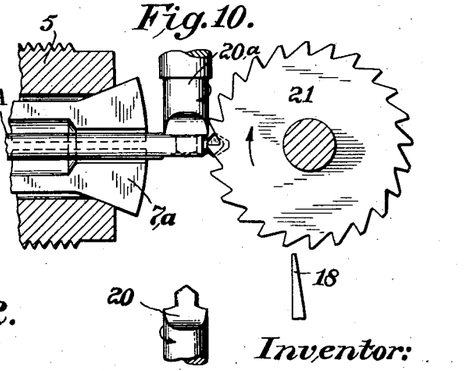

One of these drills 20 is then advanced as shown in Fig. 9, to bore nearly through the stock bar from one side, whereafter it is retracted and the other drill 20ª is advanced to bore or drill from the opposite side (Fig. 10). This prevents any breaking through of the stock and forms a smooth round hole adjacent the annular groove, which hole is provided with countersunk or beveled end edges. The stop 18 having been retracted in unison with the drill 20, a pair of parallel trimmers, such as circular saws or cutters 21, are then moved into contact with the conical head to trim off the opposite faces thereof to form the flat parallel sides.

Figure 11:
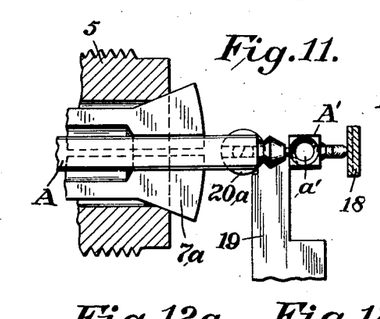

Thereafter, the drill 20ª and saws 21 being removed and the stop 18 restored to its initial position, the gripping jaws are opened and the stock automatically fed forward until the end of the shaped portion of the work (Fig. 10) contacts with the stop, as shown in Fig. 11.

Cutter 19 is now advanced, as described in Fig. 8, to preliminarily shape the head of the next article, and effect the severing of the preceding one, which breaks off easily from the partially formed piece.

Thereafter the cycle of operations is repeated until the stock bar has been completely used up.

It will be understood from the foregoing that the stock bar is gripped firmly by the chuck at all times except when the bar is to be fed forward, so that said bar is held firmly and accurately by the chuck while the cutter 19, drills 20, 20ª, and trimmers 21 are operating thereon.

The chuck is rotated by a drive belt D passing around a pulley 5ᵇ on the chuck spindle 5, and around a pulley 22 on overhead shaft 22ª, which in turn is driven by belt 22ᵇ from shaft 23, which shafts are journaled in bearings in a suitable overhead framework, such for example as wall brackets and interconnected rods supported thereby. The chuck of the machine unit remote from the operator is driven from shaft 23 by belt D¹. For applying power to shaft 23 to drive the chucks, said shaft is provided with fast and loose pulleys 24 and 25 respectively, which cooperate with belt 26 connected with any suitable overhead source of power (not shown). Belt 26 is engaged by shifter fork 27 which is under tension of spring 28 which tends constantly to throw it onto the loose pulley and disconnect the drive from the chucks.

Movement of the shifter fork in a reverse direction is effected by the flexible element 29 which extends down to and is connected with a foot or treadle lever 30. Said shaft is also provided with a brake drum 31 with which cooperates a brake shoe 32, which forms one arm of a bell-crank, the other arm thereof being connected by flexible element 33 with the treadle lever whereby the rotation of the shaft is quickly stopped when the pedal is depressed to disconnect the drive.

With the drive on and the operator having gripped the stock in the chuck by moving lever 12 in the appropriate direction, the cone cutter 19 is raised into cutting position by hand lever 34 fast on a shaft 35 (Fig. 3) journaled in a vertically slidable member or cutter carrier 36 guided in suitable ways on the head stock. Said shaft 35 carries a gear 37 fast thereon which meshes with a stationary rack 38, whereby the gear rolls on the rack and raises the cutter carrier against the tension of spring 39, which effects a quick return of the cutter carrier on release of the handle.

Figures 4, 5:
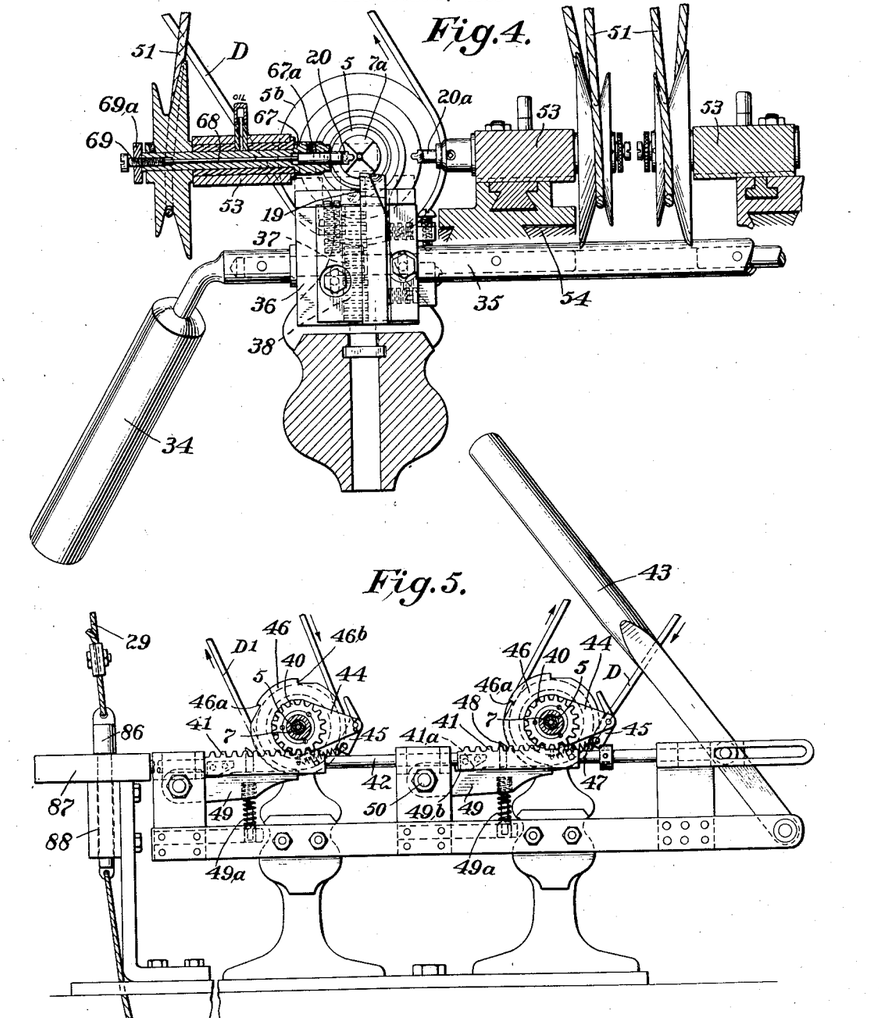
Figs. 4 is a transverse section on line 4—4 of Fig. 3.
Fig. 5 is an elevation taken on line 5—5 of Fig. 1, with parts in section.

Upward movement of the cutter carrier is limited by an abutment 36ª thereon coming in contact with an adjustable stop screw 36ᵇ threaded through an abutment or carrying projection on the machine frame, the screw being locked in adjusted position by a suitable lock nut, as shown clearly in Fig. 4.

Having completed the shaping of the cone and cutting of the annular groove in the stock, it is next in order to drill the transverse opening and trim away the opposite sides of the cone.

Before this is done, it is necessary to insure that the stock bar is accurately positioned with its flat sides perpendicular to the plane of the drills, as the mere stopping of the drive may leave the stock bar at any angle throughout 360°.

To enable this to be accomplished, I provide means which will be understood from reference to Figs. 3 and 6. Chuck spindle 5 is provided with a loose gear or pinion 40 which meshes with a slidable rack 41 carried by reciprocating bar or rod 42 actuated by hand lever 43.

Pinion 40 has fast at one side thereof an arm 44 which carries a two-armed pawl 45, one arm of which is adapted to engage either of two cooperating abutments or shoulders 46ª of a disc 46 fast on chuck shaft 5. A spring 47 tends to pull one end of the pawl towards the disc to engage the cooperating shoulders thereon. The other arm of the pawl normally engages an abutment member 48 carried by an index latch piece 49 fulcrumed on pin or bolt 50, which holds the pawl out of contact with the disc when hand lever 43 is in normal or retracted position, (Fig. 6).

Assuming that the drive has stopped, and the chuck shaft is to be indexed to proper position, the operator moves lever 43 to the right, Fig. 6, which causes the rack to rotate gear 40 and arm 44. This moves the tail of the dog or pawl 45 away from abutment 48 and allows the spring to pull the end of the pawl into contact with the edge of the disc. If no abutment recess is opposite the pawl, it will ride on or slide over the edge of the disc until it drops into one or the other of the abutment recesses and will rotate the disc and chuck shaft the amount necessary to bring the work in proper position, the throw or range of movement of rod 42 being calculated for this purpose. To prevent overthrow of the disc, index latch 49 is pressed upward by a spring 49$^a$ into contact with the disc 46.

The end of the index latch 49 is formed as a pawl to coact with reversely placed shouldered recesses 46$^b$ in the edge of the disc 46. As the rack bar moves to the right, abutment 41$^a$ will slide along the face of lever 49 until it reaches the low or recessed portion 49$^b$, when the spring 49$^a$ will force lever 49 upward into contact with the edge of the disc and in readiness to engage one or the other of the shoulders 46$^b$ to positively index or stop the motion of the disc at the precise point desired.

The work is now ready for the drilling and trimming operation of the drills and trimmers, which normally are in continuous operation, but out of working position, the drills being driven by belts 51 from overhead pulleys 51$^a$ and the trimming saws by belts 52 from overhead pulleys 52$^a$.

Figure 2:
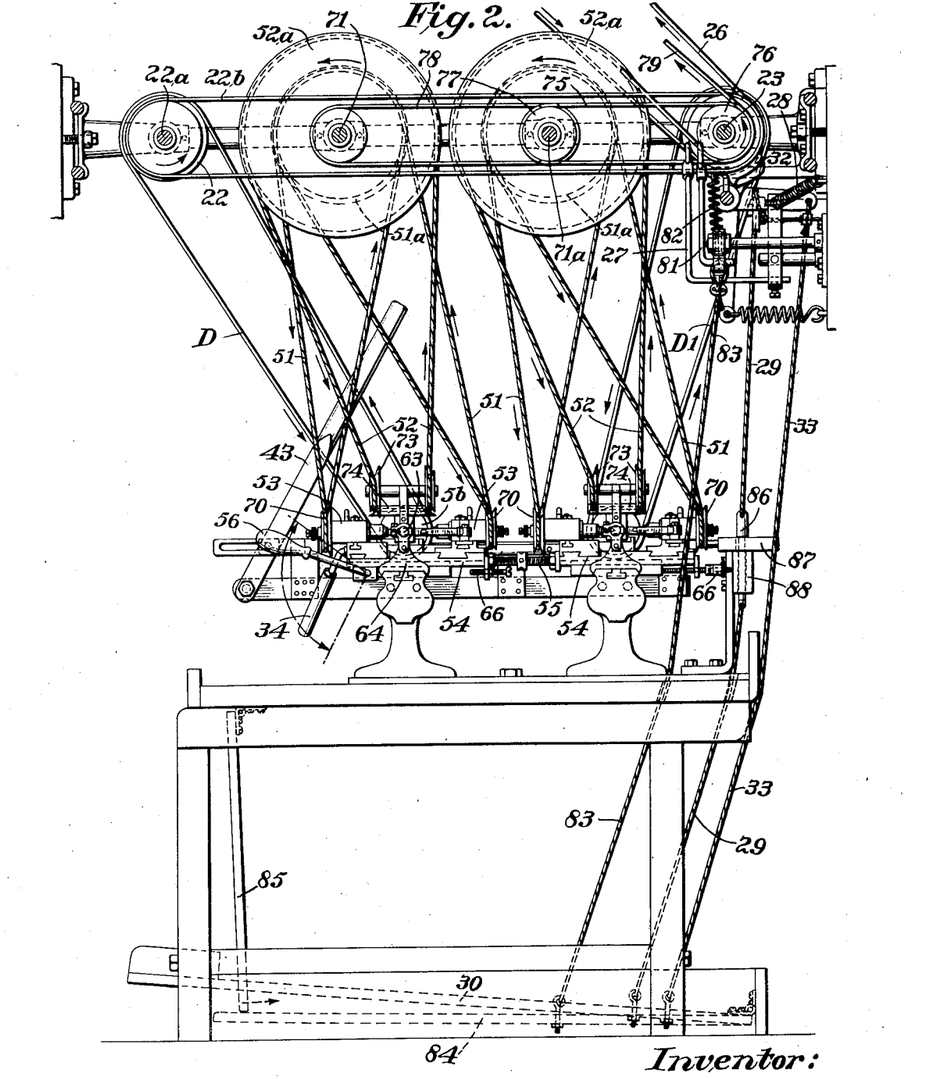
Fig. 2 is an end elevation of the complete machine.

The drills are indicated at 20, 20$^a$, and have their carrier shafts journaled in suitable carrier blocks 53 adjustably mounted on slide members 54. The slide members of the two units are coupled together by a right and left threaded rod 55, Fig. 2, by which they may be adjusted relative to each other and which causes the movement of one to transmit similar movement to the other. The slide member at the front or operator's side of the machine is provided with a crank handle 56 which is fast to a gear 57 which meshes with a horizontal rack 58 carried by slide member 54. Upward movement of handle 56 to the limit indicated by the upper arrow-head, Fig. 2, moves the slide members to cause one set of drills to move to the position shown in Fig. 9, while downward movement of the handle to the position indicated by the lower arrow-head, Fig. 2, brings the other set of drills into the position shown in Fig. 10. Simultaneously with this last named movement, a roller 59 carried by a projection from the slide engages the inclined face of a cam piece 60 mounted on the side of the carrier 61 of the trimming cutters 21 and forces the latter forward to bring the cutters into the position shown in Fig. 10, to trim the sides of the cone.

Carrier 61 is mounted on a slide bar 63 guided in and supported by the bracket members 64 and is normally retracted by spring 65.

Movement of the slide in either direction is limited by adjustable stops 66. It may be noted at this point that provision is made for an independent and fine or micrometer adjustment of each drill in an axial direction. For this purpose I make the drill stocks or carrier shafts 67 hollow, the drills 20, 20$^a$, being inserted in enlarged tubular bores in the front ends thereof and locked in working position by means of set screws 67$^a$, see Fig. 4.

Each drill has an intermediate rod 68 which extends through the reduced tubular bore of the carrier shaft and abuts at its rear end an adjusting screw 69 tapped into the outer end of the drill shaft and provided with a lock nut 69$^a$.

On loosening the locking screw 67$^a$ any desired adjustment of the drill relative to the carrier shaft may be made in order to accurately position it in relation to its work.

The belts 51 which drive the drills pass around sheaves 70 on the drill shafts or spindles and around the overhead drive pulleys 51$^a$ on shafts 71 and 71$^a$; while the belts 52 which drive the saws pass around idle pulleys of sheaves 73 and pulleys 74 on the saw shafts, and also around the overhead drive pulley 52$^a$ on said shafts 71, 71$^a$.

Shaft 71$^a$ is driven by belt 75 which passes around a wide pulley 76 loose on shaft 23 and around a wide pulley 77 on shaft 71$^a$ which wide pulley, by belt 78, drives shaft 71. Pulley 75 is driven by belt 79 from an overhead wide drive pulley, not shown, and is capable of being shifted onto an adjacent loose pulley 80 by belt shifter 81. A spring 82 tends to throw the belt shifter onto the loose pulley and in driving position, Fig. 7, and the belt is capable of being shifted onto pulley 76 for driving purposes, by a flexible element 83 connected to a foot treadle 84 which can be held in its depressed position by a swinging latch bar 85.

It is of vital importance that means should be provided to prevent the advance of the drills and saws while the stock is rotating or when it is in other than indexed position, and also to prevent any possibility of the stock being rotated during the drilling and trimming operations. To this end I include in the flexible element 29 a shouldered locking member 86 having a reduced shank passing through an elongated recess 87$^a$ in a member 87 secured to the end of the reciprocating indexing rack-bar 42, and vertically guided by a support 88 through which the reduced shank projects. When the parts are in indexed position, as shown in Fig. 5, at which time the operator manipulates the handle which brings the drills and trimmers into action, the shouldered portion of member 86 rests upon the top of the slotted bar 87 and prevents the depression of treadle 30 and the consequent application of drive to rotate the stock. When the index lever 43 and rack bar 42 are moved back to initial position, the slotted bar 87 passes clear of the shouldered portion of member 86 and the treadle is free to be operated, but while pressed down the index slide cannot be operated, due to the inability of the large upper portion of member 86 to enter the slot in member 87.

I find it desirable to provide air blast nozzles 90 positioned to blow through the chucks to keep them clean, the rear ends of the chuck shafts being flared to facilitate this and also to enable the stock to be more readily inserted.

After the member has been produced by the machine operating in the manner above described, and as illustrated in Fig. 12, it is slotted at the base by means such as a suitable saw, to provide the stringer receiving slot which enables a series to be applied to a carrying tape.

While, in the foregoing description, I have referred to the use of bars having flat sides or of substantially rectangular shape in cross section, it is to be understood that I do not limit myself to stock bars of this particular shape, as it is possible to use bars of circular cross section. The flat sided bars are preferable as saving in cost of material and amount to be removed.

In the event of using cylindrical stock bars the indexing operation will be unnecessary, but the finished element would have rounded faces unless an additional operation is performed.

It will also be understood that while I have shown the trimming cutters as moving axially of the stock bar, they could, without departing from the spirit of my invention, be arranged to move transversely thereof, as for example by being carried by one of the drill slides and moved thereby.

Having thus described my invention, what I claim is:—

1. In apparatus of the class described, a tubular chuck having gripping jaws with means for operating them, means for feeding a stock bar therethrough, means for intermittently rotating said chuck, cutting means for cutting a cone-shaped head and annular base groove in said stock while rotating, drill means for drilling said stock bar adjacent the base groove, and indexing means for bringing said stock bar into position with its flat sides perpendicular to the axis of the drill means and for positively holding it in such position during the drilling operation.

2. In apparatus of the class described, a tubular chuck having gripping jaws with means for operating them, means for feeding a stock bar therethrough, means for intermittently rotating said chuck, cutting means for cutting a cone-shaped head and annular base groove in said stock while rotating, drill means for drilling said stock bar adjacent the base groove, and indexing means for bringing said stock bar into position with its flat sides perpendicular to the axis of the drill means and for positively holding it in such position during the drilling operation, and means for automatically locking the chuck rotating means against action by the movement of said indexing means.

3. In apparatus of the class described, means for alternately rotating a flat-sided stock bar and holding it against rotation, means for turning a cone-shaped head and annular base groove thereon while rotating, a pair of opposed drills, means for causing them to advance alternately to bore through said stock bar while held stationary in predetermined position, and means for trimming off opposed faces of the cone while so held.

4. In apparatus of the class described, means for alternately rotating a flat-sided stock bar and holding it against rotation, means for turning a cone-shaped head and annular base groove thereon while rotating, a pair of opposed drills, means for causing them to advance alternately to bore through said stock bar while held stationary, means for trimming off opposed faces of the cone while so held, and means whereby the advance of one of said drills automatically brings the trimming means into operation.

5. In combination, means for holding a stock bar, a pair of opposed drills, a slide carrying said drills with means for reciprocating it, trimming means, a carrier therefor movable in a rectilinear line perpendicular to the line of travel of said slide, and means whereby the movement of the slide controls the movement of said trimming means.

6. In combination, means for holding a stock bar, a pair of opposed drills, a slide carrying said drills with means for reciprocating it, trimming means, a carrier therefor movable in a rectilinear line perpendicular to the line of travel of said slide, a spring for moving said carrier in one direction, and cam means carried by the slide for actuating said carrier against the tension of the spring.

7. In combination, a hollow chuck carrying gripping jaws with means for operating them, means for rotating said chuck intermittently, pressing means tending to urge the stock bar through the chuck when the jaws are open, a turning tool for cooperating with the bar while rotating, a pair of opposed rectilinearly movable drills for drilling said stock bar while stationary, a slide carrying said drills, and a stop carried by said slide and movable into and out of the path of the stock bar.

8. In combination, a hollow chuck carrying gripping jaws with means for operating them, means for rotating said chuck intermittently, pressing means tending to urge the stock bar through the chuck when the jaws are open, a turning tool for cooperating with the bar while rotating, a pair of opposed rectilinearly movable drills for drilling said stock bar while stationary, a slide carrying said drills, a stop carried by said slide and movable into and out of the path of the stock bar, trimming means, a carrier therefor movable rectilinearly in a path perpendicular to the path of the slide, and means whereby the movement of the slide in a direction to remove the stop from the line of the stock bar effects the advance of said carrier.

9. In combination, a rotary chuck having stock-bar gripping jaws, with means for operating them, means for rotating said chuck intermittently, turning and cutting off means for acting on the bar while rotated by the chuck, indexing means for bringing said bar to rest in a determined position when the drive to said chuck is disconnected, and devices for operating on the bar after it has been so positioned.

10. In combination, a tubular chuck for receiving a flat-sided stock bar, having gripping jaws with means for operating them, driving means connectible to and disconnectible from said chuck, a cutting device for acting on said bar while rotating, drilling means for forming an opening through said stock bar, and indexing means for positioning said bar with its flat sides perpendicular to said drilling means when the drive to the chuck is disconnected.

11. In combination, a work holding chuck, means connectible to and disconnectible therefrom for intermittently rotating the same, means for operating on the work while rotating, means for operating on said work while stationary, and indexing means for properly positioning the stock when the chuck drive is disconnected, comprising a disc fast to the chuck, and having a pair of diametrically located ratchet teeth, a pawl member movable about the axis of said disc and normally out of contact therewith, and means for moving said pawl about said axis and for throwing it into contact with said disc.

12. In combination, a work holding chuck, means connectible to and disconnectible therefrom for intermittently rotating the same, means for operating on the work while rotating, means for operating on said work while stationary, and indexing means for properly positioning the stock when the chuck drive is disconnected, comprising a disc fast to the chuck, and having a pair of diametrically located ratchet teeth, a pawl member movable about the axis of said disc and normally out of contact therewith, and means for moving said pawl about said axis and for throwing it into contact with said disc, said disc having a pair of reversely placed ratchet teeth, and a pawl articulated on a fixed axis and adapted to cooperate with said reversely placed ratchet teeth, and means whereby said pawl is thrown into contact with said disc simultaneously with the action of said first named pawl.

13. In combination, a work holding chuck, means connectible to and disconnectible therefrom for intermittently rotating the same, means for operating on the work while rotating, means for operating on said work while stationary, and indexing means for properly positioning the stock when the chuck drive is disconnected, comprising a disc fast to the chuck, and having a pair of diametrically located ratchet teeth, a gear adjacent said disc and rotatable about the axis thereof, an arm connected with said gear and carrying a pawl cooperating with the teeth on said disc, and means for normally holding the pawl out of contact with the disc.

14. In combination, a work holding chuck, means connectible to and disconnectible therefrom for intermittently rotating the same, means for operating on the work while rotating, means for operating on said work while stationary, and indexing means for properly positioning the stock when the chuck drive is disconnected, comprising a disc fast to the chuck, and having a pair of diametrically located ratchet teeth, a gear adjacent said disc and rotatable about the axis thereof, an arm connected with said gear and carrying a pawl cooperating with the teeth on said disc, said disc having also a second pair of ratchet teeth facing in the opposite direction from said first named ratchet teeth, a pawl articulated on a fixed pivot for cooperating with said second pair of ratchet teeth, means whereby the movement of the rack bar controls the action of said pawl, and means carried by said last named pawl for holding the first named pawl out of action when the rack is in initial position.

15. In apparatus of the class described, a tubular chuck having gripping jaws with means for operating them, means for feeding a stock bar therethrough, means for intermittently rotating said chuck, cutting means for cutting a cone-shaped head and annular base groove in said stock while rotating, drill means for drilling said stock bar adjacent the base groove, and indexing means for bringing said stock bar into position with its flat sides perpendicular to the axis of the drill means and for positively holding it in such position during the drilling operation, and means for trimming off opposed faces of the cone-shaped head while so held.

In testimony whereof, I affix my signature.

JOSEPH E. PERRAULT.